(12) United States Patent
Turnasella

(10) Patent No.: US 7,620,654 B2
(45) Date of Patent: Nov. 17, 2009

(54) SYSTEM AND METHOD PROVIDING USER DEFINABLE ON-LINE WAGE AND SALARY REPORTS

(76) Inventor: Theodore Turnasella, 81 Edgewood Rd., West Islip, NY (US) 11795

( * ) Notice: Subject to any disclaimer, the term of this patent is extended or adjusted under 35 U.S.C. 154(b) by 0 days.

(21) Appl. No.: 10/057,016

(22) Filed: Jan. 25, 2002

(65) Prior Publication Data

US 2003/0145015 A1    Jul. 31, 2003

(51) Int. Cl.
   G06F 7/00    (2006.01)
   G06F 17/00   (2006.01)
   G06F 17/30   (2006.01)
(52) U.S. Cl. .................. 707/104.1; 707/100; 705/10
(58) Field of Classification Search .......... 707/1, 707/3, 10, 104.1; 705/7, 10, 11, 30
   See application file for complete search history.

(56) References Cited

U.S. PATENT DOCUMENTS

| | | | | |
|---|---|---|---|---|
| 6,249,770 B1 * | 6/2001 | Erwin et al. | .................. | 705/10 |
| 6,401,079 B1 * | 6/2002 | Kahn et al. | .................... | 705/30 |
| 6,477,504 B1 * | 11/2002 | Hamlin et al. | ................ | 705/10 |
| 6,741,993 B1 * | 5/2004 | Zitaner et al. | ................. | 707/10 |

* cited by examiner

*Primary Examiner*—Etienne P LeRoux
*Assistant Examiner*—Susan Y Chen
(74) *Attorney, Agent, or Firm*—Daniel P. Burke & Associates, PLLC

(57) ABSTRACT

A system and method for providing salary data to a self designated survey group comprises the step of establishing a salary survey service on a server for storing and accessing salary data. Once established, the salary survey service accepts membership from a plurality of members through the salary survey service. At least a portion of the members then store salary data on a database that is associated with the server. The members are grouped into a survey group designated by a portion of the plurality of members. Salary surveys are generated for the survey group using the stored salary data provided by members of the survey group. The generated surveys may then be accessed via the Internet.

39 Claims, 13 Drawing Sheets

| Name | Type | Size | Description |
|---|---|---|---|
| Acct_ID | Text | 20 | Customer Account ID |
| Acct_Password | Text | 20 | Customer Password |
| Acct_Type_Code | Text | 1 | Type of Account Code -->'C'=Contributor 'S'=Subscriber 'A' Administrator |
| Acct_Type_Date | Date/Time | 8 | Expiration Date For This Account |
| Acct_Industry_Code | Text | 10 | Industry Code |
| Acct_Company_Name | Text | 50 | Company Name |
| Acct_Contact_Title | Text | 50 | Account Contact Title |
| Acct_Contact | Text | 50 | Account Contact Name |
| Acct_Address1 | Text | 50 | Account Address 1 |
| Acct_Address2 | Text | 50 | Account Address 2 |
| Acct_City | Text | 50 | Account City |
| Acct_State | Text | 2 | Account State |
| Acct_Zip | Text | 10 | Account Zip |
| Acct_Zip3 | Text | 3 | First 3 characters of Default Zip |
| Acct_Area_Code | Text | 3 | Account Default Area Code |
| Acct_Phone | Text | 20 | Account Contact Phone Number |
| Acct_Fax | Text | 20 | Account Contact Fax Number |
| Acct_Email | Text | 50 | Account Contact E-Mail Address |
| Acct_Company_Size | Long Integer | 4 | Number of Employees |
| Acct_Company_Revenue | Currency | 8 | Total Company Revenue in 000's |
| Acct_Domestic_Locations | Long Integer | 4 | Number of Domestic Locations |
| Acct_Union | Yes/No | 1 | Flag to indicate whether this account has a union |
| Acct_Active | Yes/No | 1 | Flag to indicate whether this account is active or inactive |
| Acct_Notes | Text | 255 | Account Notes |

*FIG. 3*

| Name | Type | Size | Description |
|---|---|---|---|
| Area_Code | Text | 3 | Area Code |
| Area_Code_State | Text | 2 | State where this area code is used |
| Area_Code_Detail | Text | 100 | Local area within state where this area code is used |

FIG. 4

| Name | Type | Size | Description |
|---|---|---|---|
| Control_Field | Text | 30 | Area within application which can be controlled by setting the Control_Data filed during setup (administrative function) |
| Control_Data | Text | 50 | Data entry which controls how the application behaves |
| Control_Description | Text | 255 | A description of the area controlled by the settings |

FIG. 5

| Name | Type | Size | Description |
|---|---|---|---|
| Group_Code | Text | 20 | Group code maintained in the Group_Info table. |
| Acct_Code | Text | 20 | Account Code Maintained in the Acct_Info table. |

FIG. 6

| Name | Type | Size | Description |
|---|---|---|---|
| Group_Code | Text | 20 | Code assigned to the group |
| Group_Name | Text | 50 | The name associated with the group code |
| Group_Description | Text | 255 | A description of the group |
| Sponsor_Code | Text | 20 | The code of the sponsor this group belongs to |

*FIG. 7*

| Name | Type | Size | Description |
|---|---|---|---|
| Industry_Code | Text | 10 | Code assigned to the Industry (may be SIC) |
| Industry_Description | Text | 50 | The description associated with the code. |

*FIG. 8*

| Name | Type | Size | Description |
|---|---|---|---|
| Job_Code | Text | 10 | The code assigned to the job |
| Job_Title | Text | 50 | The title associated with the job. This field may be used to match jobs. |
| Job_Description | Memo | - | A detailed description of the job. This field may also be used to match jobs. |
| Job_Requirements | Text | 255 | Additional job requirements needed to do the job (i.e. schooling, certifications, etc.) |
| Wage_or_Salary | Text | 1 | A one character flag indicating wherher the wage/salary data for the specific job is in $/hour or $/year. |

*FIG. 9*

| Name | Type | Size | Description |
|---|---|---|---|
| Links_Message_Number | Long Integer | 4 | Internally generated number. |
| Links_Message_Sort_Order | Text | 10 | The order to be used to display the Link Messages. |
| Links_Message_Text | Text | 255 | The actual message to display with the embedded web address to the specified site. |

*FIG. 10*

| Name | Type | Size | Description |
|---|---|---|---|
| News_Message_Number | Long Integer | 4 | Internally generated number. |
| News_Message_DTTM | Date/Time | 8 | The date/time of the news message. |
| News_Message_Text | Text | 255 | The text of the news item. |
| News_Message_Exp_DTTM | Date/Time | 8 | The date/time this message should no longer display |

FIG. 11

| Name | Type | Size | Description |
|---|---|---|---|
| ID | Long Integer | 4 | Internally generated number. |
| Acct_ID | Text | 20 | The account code of the company running the report. |
| RG_DTTM | Date/Time | 8 | The date/time the report was run. |
| Job_Code_Selected | Text | 10 | The job code selected for reporting. |
| AC1_Selected | Text | 3 | The first Area Code selected. |
| AC2_Selected | Text | 3 | The second Area Code selected. |
| Industry_Selected | Text | 10 | The Industry selected. |
| Size_Selected | Text | 10 | The company size selected. |
| Group_Selected | Text | 20 | The group selected. |
| Annual_Growth_Rate_Selected | Text | 6 | The annual growth rate entered. |
| Data_Points_Found | Long Integer | 4 | The number of data points found for report generation. |

FIG. 12

| Name | Type | Size | Description |
|---|---|---|---|
| Sponsor_Code | Text | 20 | The code associated with the sponsor. |
| Sponsor_Name | Text | 50 | The name of the sponsor. |
| Sponsor_Address1 | Text | 50 | Address #1 of the sponsor. |
| Sponsor_Address2 | Text | 50 | Address #2 of the sponsor. |
| Sponsor_City | Text | 50 | The sponsor's city. |
| Sponsor_State | Text | 2 | The sponsor's state. |
| Sponsor_Zip | Text | 10 | The sponsor's zip code. |
| Sponsor_Contact_Title | Text | 30 | The sponsor's contact's title. |
| Sponsor_Contact | Text | 50 | The name of the sponsor contact. |
| Sponsor_Phone | Text | 20 | The sponsor's phone number. |
| Sponsor_FAX | Text | 20 | The sponsor's FAX number. |
| Sponsor_Email | Text | 50 | The sponsor's E-mail address. |
| Sponsor_Active_Flag | Yes/No | 1 | A flag indicating whether or not a sponsor is active or inactive. |
| Sponsor_Notes | Memo | — | Comments |

FIG. 13

| Name | Type | Size | Description |
|---|---|---|---|
| Acct_ID | Text | 20 | The account ID. This id must be in the Acct_Info table |
| Job_Code | Text | 10 | The job code for which there is wage/salary data. |
| Area_Code | Text | 3 | The area code of where this job is located. This area code may not necessarily be the Contributor's Area Code. |
| Acct_Job_Title | Text | 50 | The job title as entered by the contributor. |
| Job_Holders | Long Integer | 4 | The number of people in this specific job for this account in the specific area as specified by the area code. |
| Work_Week_Hours | Double | 8 | The number of hours in the work week for this job. |
| Job_Status | Text | 1 | F – Full Time     P – Part Time |
| FLSA_Status | Yes/No | 1 | Whether the job is exempt or non-exempt. |
| wage_salary_range_min | Currency | 8 | The minimum wage/salary range for the job. |
| wage_salary_range_mid | Currency | 8 | The mid wage/salary range for the job. |
| wage_salary_range_max | Currency | 8 | The maximum wage/salary range for the job. |
| wage_avg_base | Currency | 8 | The average base wage/salary for the job. |
| wage_low_base | Currency | 8 | The low base wage/salary for the job. |
| wage_high_base | Currency | 8 | The high base wage/salary for the job. |
| avg_total_comp | Currency | 8 | The average total compensation for the job. |
| Date_Eff | Date/Time | 8 | The date the information was obtained. |

*FIG. 14*

| Name | Type | Size | Description |
|---|---|---|---|
| Wage_Record | Long Integer | 4 | Internally generated number. |
| Acct_ID | Text | 20 | The account ID. This id must be in the Acct_info table. |
| Job_Code | Text | 10 | The job code for which there is wage/salary data. |
| Area_Code | Text | 3 | The area code of where this job is located. This area code may not necessarily be the Contributor's Area Code. |
| Acct_Job_Title | Text | 50 | The job title as entered by the contributor. |
| Job_Holders | Long Integer | 4 | The number of people in this specific job for this account in the specific area as specified by the area code. |
| Work_Week_Hours | Double | 8 | The number of hours in the work week for this job. |
| Job_Status | Text | 1 | F - Full Time        P - Part Time |
| FLSA_Status | Yes/No | 1 | Whether the job is exempt or non-exempt. |
| wage_salary_range_min | Currency | 8 | The minimum wage/salary range for the job. |
| wage_salary_range_mid | Currency | 8 | The mid wage/salary range for the job. |
| wage_salary_range_max | Currency | 8 | The maximum wage/salary range for the job. |
| wage_avg_base | Currency | 8 | The average base wage/salary for the job. |
| wage_low_base | Currency | 8 | The low base wage/salary for the job. |
| wage_high_base | Currency | 8 | The high base wage/salary for the job. |
| avg_total_comp | Currency | 8 | The average total compensation for the job. |
| Date_Eff | Date/Time | 8 | The date the information was obtained. |

FIG. 15

| Name | Type | Size | Description |
|---|---|---|---|
| Acct_ID | Text | 20 | The account ID. This id must be in the Acct_info table. |
| Job_Code | Text | 10 | The job code for which there is wage/salary data. |
| Area_Code | Text | 3 | The area code of where this job is located. This area code may not necessarily be the Contributor's Area Code. |
| Acct_Job_Title | Text | 50 | The job title as entered by the contributor. |
| Job_Holders | Long Integer | 4 | The number of people in this specific job for this account in the specific area as specified by the area code. |
| Work_Week_Hours | Double | 8 | The number of hours in the work week for this job. |
| Job_Status | Text | 1 | F – Full Time    P – Part Time |
| FLSA_Status | Yes/No | 1 | Whether the job is exempt or non-exempt. |
| wage_salary_range_min | Currency | 8 | The minimum wage/salary range for the job. |
| wage_salary_range_mid | Currency | 8 | The mid wage/salary range for the job. |
| wage_salary_range_max | Currency | 8 | The maximum wage/salary range for the job. |
| wage_avg_base | Currency | 8 | The average base wage/salary for the job. |
| wage_low_base | Currency | 8 | The low base wage/salary for the job. |
| wage_high_base | Currency | 8 | The high base wage/salary for the job. |
| avg_total_comp | Currency | 8 | The average total compensation for the job. |
| Date_Eff | Date/Time | 8 | The date the information was obtained. |

*FIG. 16*

Salary Report

| Job Code: | C215 |
|---|---|
| Job Title: | Payroll Clerk |
| Job Summary: | Processes payroll time sheets to ensure accurate payroll calculations and compliance with company payroll policies. Applies appropriate tax rates. Prepares special reports. |
| Job Requirements: | High School plus 2 years of related experience. |

Profile of Sample

| Area Codes: | 516-212 | Industry: | Banking | Avg Company Size: | 2,423 |
|---|---|---|---|---|---|
| Records Matching: | 53 | Number/Exempt: | 0 | Number/Non-Exempt: | 165 |
| Avg. Hrs/Week: | 38.45 | Total Incumbents: | 165 | | |

Processed Wage/Salary Information: (Per Hour)

| Avg Base Wage: | $14.77 | Avg Range Minimum: | $11.10 | Avg Total Compensation: | $14.81 |
|---|---|---|---|---|---|
| 25th Pctl: | $13.24 | Avg Range Midpoint: | $14.25 | 25th Pctl: | $13.36 |
| 50th Pctl: | $14.69 | Avg Range Maximum: | $16.87 | 50th Pctl: | $14.83 |
| 75th Pctl: | $15.88 | Avg Range Spread: | 51.98% | 75th Pctl: | $15.96 |
| Std Dev: | $0.81 | | | | |

FIG. 19

SYSTEM AND METHOD PROVIDING USER DEFINABLE ON-LINE WAGE AND SALARY REPORTS

TECHNICAL FIELD

The present invention relates to the provision of salary surveys, and more particularly, to providing a company or individual the ability to obtain survey group data for a self-designated group via the Internet.

BACKGROUND OF THE INVENTION

The use of external labor market surveys as a resource to design and administer salaries from medium and large companies is well established. Companies with formal pay plans, and even companies with no formal pay plans, use labor market data to evaluate their pay structures and policies to make sure they maintain a competitive position in the market. In recent years, there has been an increasing reliance on market data as competition, both nationally and internationally, has increased in intensity. The trend in pay policy development has been to establish base pay and market levels and to increase pay potential through the use of variable pay options, such as merit increases, bonuses, team incentives, and other alternatives. Such approaches to pay rely heavily on timely, accurate labor market information.

In order for companies to obtain and maintain accurate market information in a timely fashion, they must have continuing and updatable access to salary information in order to provide important information necessary to make salary and personnel decisions. Presently, a number of surveys on various market industries and market sectors are available to employers. However, this information, which is not specifically directed to a particular company's needs, may not provide information relevant to a specific company within its own competitive market area. Furthermore, without specific information on how the survey data was obtained, the survey may not prove beneficial to a particular company since they are unsure as to whether the data relates to information in their specific hiring market or company demographic.

In addition to providing survey information of this type in a hard copy format, many industries and industry associations are providing survey data in an on-line fashion. Users may pull up on-line information on a particular industry or sector from a pre-existing survey or they may call up existing survey information relating to certain predetermined geographic areas defined by a surveyor.

However, in each of these situations, the information gatherer is still limited to the information that is actually obtained by the surveyor which may or may not be relevant to the market sector with which a particular company is concerned. Therefore, there is a need for an interactive salary and wage survey website providing the ability for companies to obtain wage and salary information specific to their particular industry needs.

SUMMARY OF THE INVENTION

The present invention comprises a system wherein a service provider provides a website enabling contributing members to store salary data relating to benchmarked job positions and to extract processed salary reports from the database whenever desired. A company that opts to contribute wage information to the database, i.e., a contributing member subscribes to the system by paying an entry fee to the service provider or the sponsoring organization and providing salary data of the company to the service provider for storage in a database associated with the website. A number of contributing members may be associated together as a survey group by the service provider of the website or by a sponsoring organization. The rules governing the collection of salary information and admittance into the group will be determined by the survey group and the website provider. The salary data from the contributing members of a survey group is processed in a predetermined fashion into surveys and access to the surveys is provided to the survey group via the Internet. Other companies who do not contribute salary information, i.e., subscribing members, may access the salary information in the database for an entry fee paid to the service provider or the sponsoring organization.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 3 illustrates database table ACCOUNT INFORMATION;

FIG. 4 illustrates database table AREA CODE INFORMATION;

FIG. 5 illustrates database table APPLICATION CONTROL INFORMATION;

FIG. 6 illustrates database table GROUP ACCOUNT ASSOCIATION;

FIG. 7 illustrates database table GROUP INFORMATION;

FIG. 8 illustrates database table INDUSTRY CODE INFORMATION;

FIG. 9 illustrates database table JOB CODE INFORMATION;

FIG. 10 illustrates database table LINKS MESSAGES INFORMATION;

FIG. 11 illustrates database table NEWS MESSAGES CODES;

FIG. 12 illustrates database table REPORTS RUN INFORMATION;

FIG. 13 illustrates database table SPONSOR INFORMATION;

FIG. 14 illustrates database table WAGE INFORMATION;

FIG. 15 illustrates database table ARCHIVED WAGE INFORMATION;

FIG. 16 illustrates database table UNCONFIRMED WAGE INFORMATION;

FIG. 19 illustrates a wage and salary report generated by the system of the present invention.

DETAILED DESCRIPTION

Figure 1:
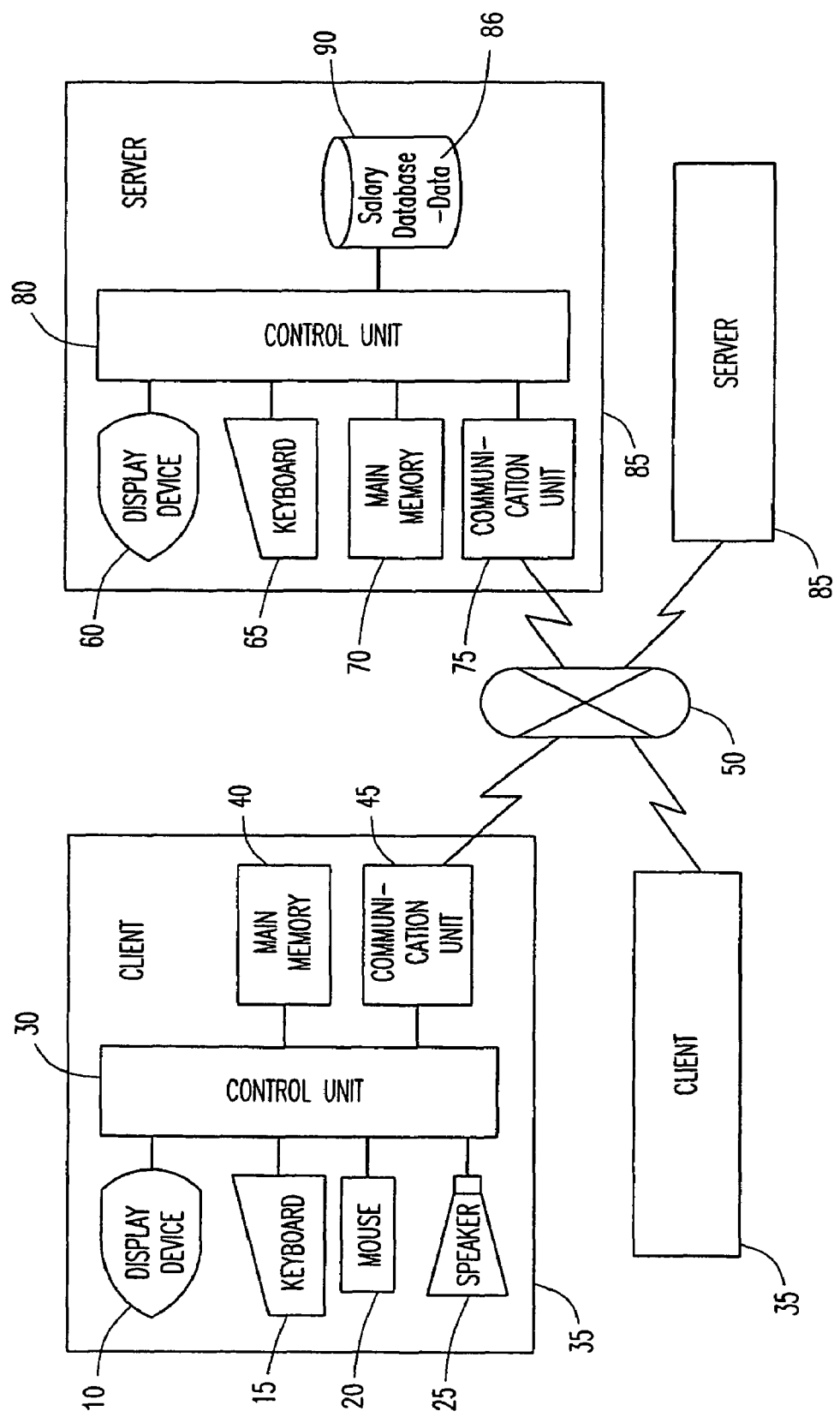
FIG. 1 shows a block diagram of a system configuration in one embodiment of a on-line salary survey system in accordance with the present invention.

Referring now to the drawings, and more particularly FIG. 1, which shows a block diagram of a system configuration of an on-line salary system in accordance with the present invention. In FIG. 1, a number 35 denotes a client which a company uses for obtaining on-line salary information. Numeral 10 denotes a display device used to display salary data. Numeral 15 denotes a keyboard and a numeral 20 denotes a mouse. They are used by a company user for accessing the system. Numeral 25 denotes a speaker which outputs audio information when information by audio is included within the salary information. Numeral 30 denotes a control unit which realizes various functions of the salary client 35 in accordance with a program stored in a main memory 40. The salary client 35 exchanges data with a salary server, to be described later, through a network 50 such as a PSTN (public switch telephone network) or the Internet via communication unit 45. The salary client 35 may comprise a dedicated terminal device as well as a general purpose information terminal device such as a so-called personal computer (PC) may be used.

Numeral 85 denotes a salary server of the on-line salary system. The salary server 85 comprises a display device 60, a keyboard 65, a main memory 70, a communication unit 75 and a control unit 30. The control unit 80 transmits salary data 86 in response to a request from the salary client 35. The salary data 86 and salary database 90 are stored in a memory unit such as a disc device, hard drive or random access memory which is accessed by the control unit 80. The display device 60 and the keyboard 65 are used for the maintenance of the program and data in the salary server 85. The salary client 35 is connected to the network 50 through the communications unit 75.

In the present invention, there may be one or more salary servers 85 and one or more salary clients 35 connected to the network 50. Each salary client 35 may access any salary server 85. The salary data 86 is maintained for each salary server 85. The salary server 85 includes a professionally managed, interactive salary database 90 of wage and salary levels for selected benchmarked jobs. A benchmarked job is a job type or job category that would exist in most companies (e.g., payroll). Benchmarked job information is useful to a company that wants to match its wage levels with those in the marketplace. The control unit 80 groups salary data in accordance with instructions received from a client 35, as will be discussed more fully below, and compares wage rates and salaries to other companies within a geographic area, industry or company size.

The database 90 consists of tables and fields necessary to maintain the required salary data 86 provided by the various members. All programs accessing the database 90, which are stored in the memory 70, are database independent. Referring now to FIGS. 2-16, there are illustrated the various tables 150 stored with the database 90 that will store wage and salary data 86 and enable the query and display of data by a member. The database 90 comprises all table and relationship data. Database queries are made using standard SQL from the ASP VBScript code which will enable the database to be easily migrated to other database structures if desired.

Figure 2:
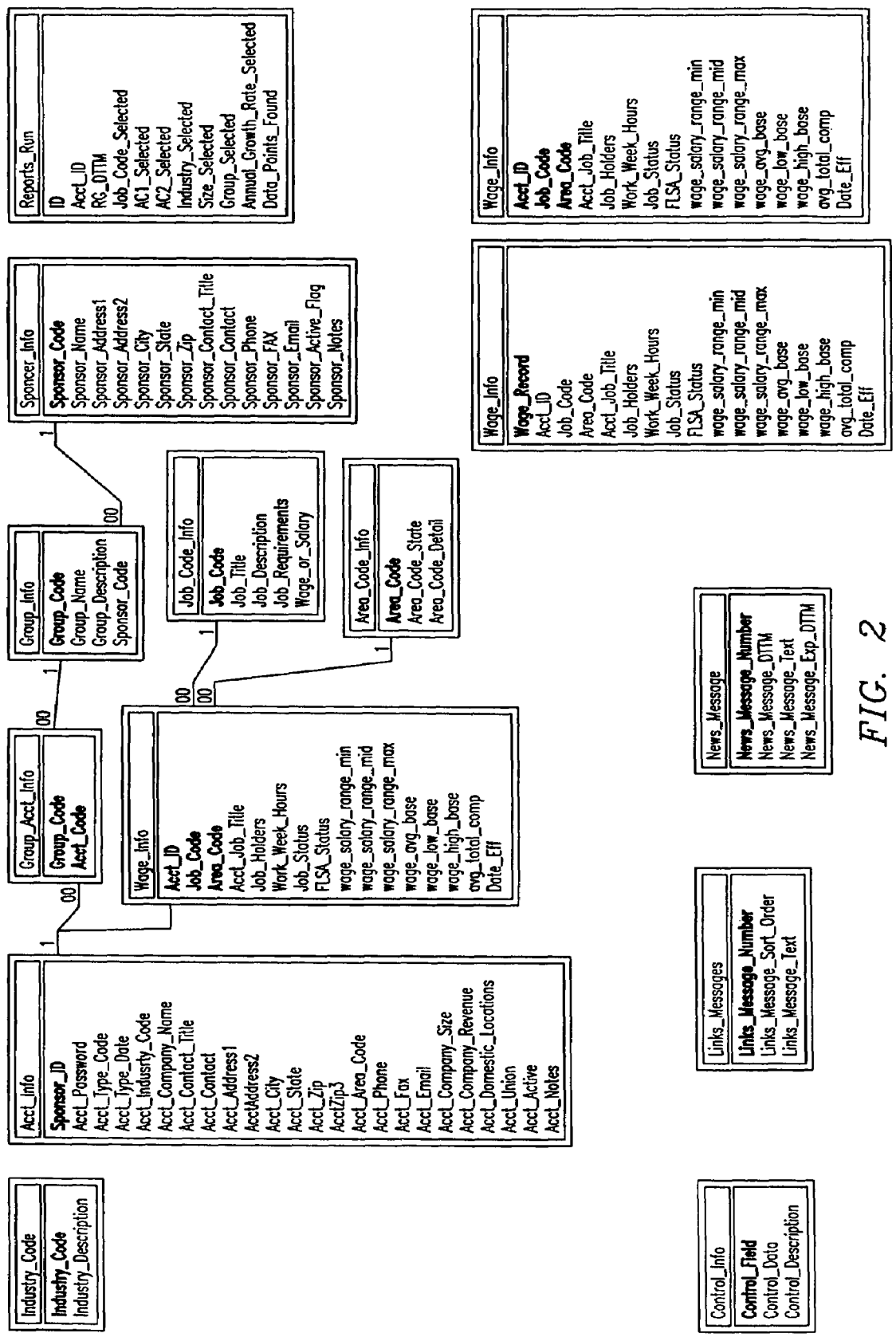
FIG. 2 illustrates WageLink Table relationships.

FIG. 2 illustrates the various relationships between tables stored within the database 90. FIG. 3 illustrates the table ACCOUNT INFORMATION. The ACCOUNT INFORMATION table maintains all registered users of the application. The account type code determines the type of account and in turn the access allowed by the user within the application.

FIG. 4 illustrates the table AREA CODE INFORMATION. The AREA CODE INFORMATION table maintains the area code description data for the various area codes as defined by the telephone company FIG. 5 illustrates the table CONTROL INFORMATION. The CONTROL INFORMATION table allows the application administrator to set various application parameters to allow certain aspects of the application to perform in different ways. The following items can be controlled by the settings in the CONTROL INFORMATION table. The default gross percent parameter specifies the default value used in calculating aged wages for reports. The minimum data needed parameter specifies the minimum number of wage data points necessary to generate a report. The news days parameter specifies the number of days news should be considered new and should display the new graphic. The wage expire days parameter discloses the maximum number of days allowed for wage data before it is considered to expire.

FIG. 6 illustrates the GROUP ACCOUNT ASSOCIATION table. The GROUP ACCOUNT ASSOCIATION table associates a specific account with a specific subgroup. Once associated, all wage information provided by the account is available to all members of the specified subgroup as will be more fully described below.

FIG. 7 illustrates the database table GROUP INFORMATION. The GROUP INFORMATION table maintains the group codes created along with demographic information and the sponsoring information for self-designated subgroups within the system contributors. The establishment of a subgroup will be more fully described below.

FIG. 8 illustrates the INDUSTRY CODE INFORMATION table. The INDUSTRY CODE INFORMATION table maintains a list of all possible industry codes along with a description associated with the code.

FIG. 9 illustrates the database table JOB CODE INFORMATION. The JOB CODE INFORMATION table maintains all possible job codes along with any information associated with the job code.

FIG. 10 illustrates the table LINKS MESSAGES. The LINKS MESSAGES table maintains all the links to other associated web sites along with a short description for display within the news page.

FIG. 11 illustrates the database table NEWS MESSAGES. The NEWS MESSAGES table maintains all news messages for display upon a news page provided by the salary survey service provider.

FIG. 12 illustrates the database table REPORTS RUN. The REPORTS RUN table maintains a list of every attempted report along with a number of data points found for the specified parameters. This report can be used to track application usage by each account for billing purposes, statistical analysis at peak times or problem resolution.

FIG. 13 illustrates the database table SPONSOR INFORMATION. The SPONSOR INFORMATION table allows for the maintenance of sponsor codes and all associated demographic information for sponsors of various subgroups.

FIG. 14 illustrates the table WAGE INFORMATION. The WAGE INFORMATION table maintains all the contributor wage data. Contributor and subscriber memberships will be more fully described below. Each account ID, job code and area code combination makes up a unique record and adds associated wage information on the record. This table is used to generate wage/salary reports for users of the system as will be more fully described below.

FIG. 15 illustrates the database table WAGE INFORMATION ARCHIVED. The WAGE INFORMATION ARCHIVED table maintains all the historical wage information records that have been replaced with newer information. This table is maintained for future use or special reporting use.

FIG. 16 illustrates the WAGE INFORMATION UNCONFIRMED database table. The WAGE INFORMATION UNCONFIRMED table maintains all wage/salary information received from contributors that has not been verified. Once verified, the associated data from the WAGE INFORMATION UNCONFIRMED table is moved in to the WAGE INFORMATION table where it is made available for reporting, and the record in the WAGE INFORMATION table is moved to the WAGE INFORMATION ARCHIVED table.

The server 85 will also include a number of business layer ASP VBScripts for controlling the controller 80 used to maintain the database 90 as well as to form the data necessary for reports, queries, etc.

Figure 17:
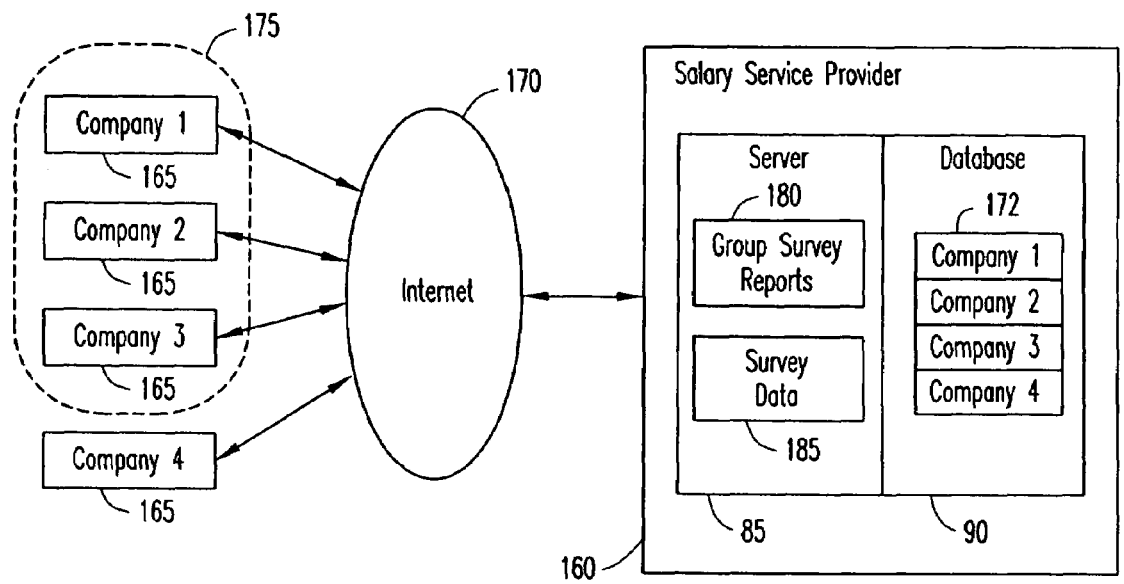
FIG. 17 illustrates the operation of a salary service provider with a plurality of companies according to the system and method of the present invention.

Referring now to FIG. 17, there is illustrated the manner in which a salary service provider 160 interacts with a plurality of companies 165. Each company 165 is able to subscribe to the services provided by the salary service provider 160. A company 165 subscribes by accessing a server 85 of the salary service provider 160 via the internet 170, signing up and paying any necessary fee. The company 165 provides wage and salary information of the company that is stored within a database 90 at a storage location 172 associated with the company 165. In addition to providing its wage and salary information for storage in the database 90, a company 165 may associate itself with a subgroup 175 (survey group) of all subscribers of the salary service provider 160. Thus, for example, company 1, company 2 and company 3 could form a subgroup 175 of, for example, textile manufacturers within the southern states.

A group survey reports functionality 180 within the server 85 enables this subgroup 175 of companies to generate specialized survey reports specifically relating to the subgroup 175 formed by the companies. In this fashion, these companies would be able to obtain salary and wage survey specific information most important to enabling these companies to make wage and salary decisions. The group survey reports functionality 180 may, in one alternative, provide the information solely to the companies 165 comprising the subgroup 175 providing information for the specialized salary survey. Alternatively, this information may be accessible to third parties which are not a member of the associated company subgroup 175.

The server 85 also provides a server survey data functionality 185 enabling any company who is a subscriber to the salary service provider 160 to access any data stored within the database 90. The survey data functionality 185 enables a company to select particular parameters by which a survey will be generated. These parameters may include but are not limited to industry, geographic region, and company size. The survey data functionality 180 also enables the data to be displayed to a user in a number of fashions including but not limited to salary weighted averages, salary median values, salary 25th percentile values, salary 75th percentile values, average total cash compensation, compensation 25th percentile, total cash compensation median, total cash compensation 75th percentile, average minimum salary range value, average midpoint salary range value, average maximum salary value and standard deviation of base salary values.

Figure 18:
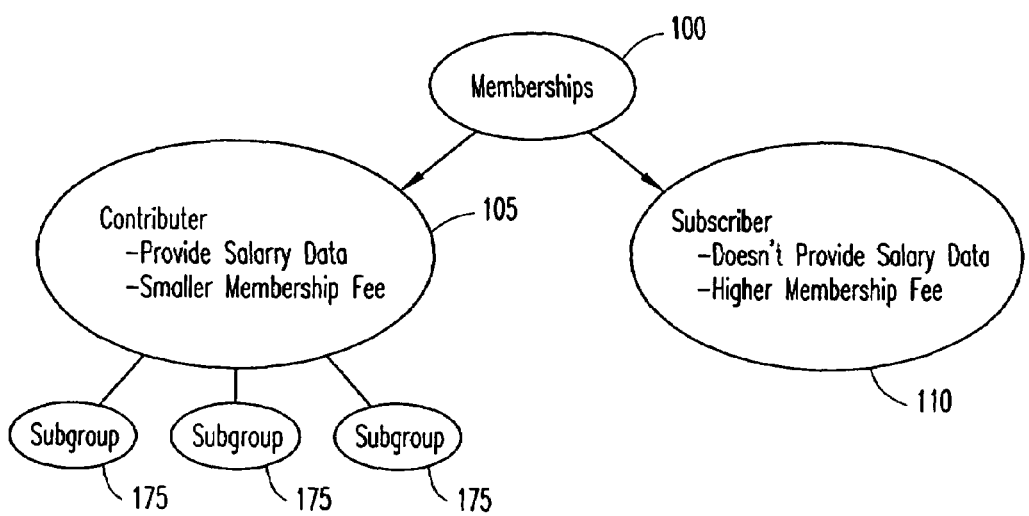
FIG. 18 illustrates the various membership levels provided by a service provider.

Referring now also to FIG. 18, after a company 165 subscribes to a membership 100 by the salary survey service provider 160, a member has a choice of at least two different kinds of memberships 100. A contributor 105 agrees to provide wage information on their company for a number of benchmarked jobs that are contained within the service providers database 90. A contributor 105 further agrees to periodically update their salary information relating to the benchmarked jobs. For providing this information and helping to grow the service provider's salary database 90, a contributor 105 is allowed an unlimited number of online salary service reports and a lower annual subscription fee. A contributor 105 agrees to provide average base wage or salary information; the number of full time employees in a job; the average total compensation (base pay plus other compensation) for each matched job; exempt status under FLSA; pay range minimums, midpoints and maximums. This, of course, is to ensure that all necessary information is obtained in order to assist the salary service provider 160 to generate the reports for contributing and subscribing members.

A second type of membership 100 comprises a subscriber 110 who has no obligation to contribute wage and salary information to the service provider's database. A subscriber 110 may generate salary reports by paying an annual subscription fee or alternatively pay for reports on a per report basis. The annual subscription fee is much greater for a subscriber 110 due to the fact that they are not assisting in building the service provider's database 90.

A contributor 105 is able to generate wage and salary reports for a plurality of benchmarked jobs contained in the database 90. These wage and salary reports include information such as average wage or salary; base wage or salary; 25th, 50th and 75th percentiles for base wage or salary; average total compensation; 25th, 50th and 75th percentile for total compensation; the number of full time employees in the job; the number of exempt and non-exempt employees represented in the report; the average scheduled hours for the work week; and the standard deviation for base wages and salaries. A report generated by a subscriber 110 would include similar information. One example of such a report is indicated in FIG. 19 for a payroll clerk. As can be seen, the report provides the job title 115, job summary 120, job requirements for the payroll clerk 125, a profile 130 of the companies that have provided information for generating the report page and a listing 135 of the processed wage and salary information described above.

A contributor 105 has the further option of being a member of one or more survey subgroups 175. A survey subgroup 175 consists of a number of companies which agree to contribute information to the database 90 and use the information for the particular subgroup 175 to generate salary and wage survey reports relating to their particular subgroup 175. The companies may or may not be members of an existing industry or professional association.

Figure 20:
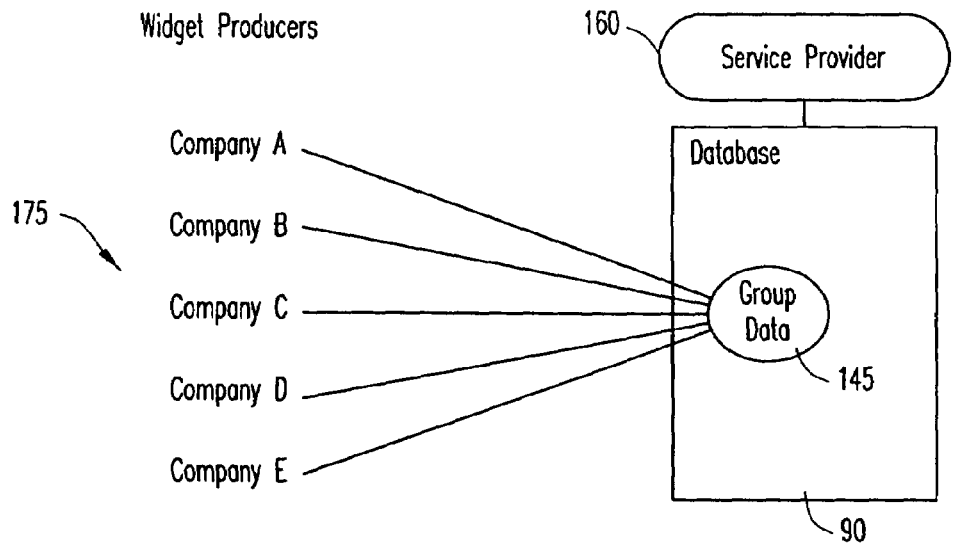
FIG. 20 illustrates formation of a subgroup by a number of companies.

Thus, for example, as shown in FIG. 20 a survey subgroup 175 of widget producers may be formed of companies A, B, C, D, and E and have an associated data group 145 formed in the database 90 for this subgroup 140 of widget producers. The data group 145 consists of the data stored within the various tables discussed in FIGS. 2-16 associated with members of the subgroup. The companies select which jobs they wish to include in their surveys. The selected jobs may be made from the job summaries already contained within the service providers' database 90 or the subgroup 175 could further develop additional job summaries more suited to the information desired by the group. The service provider 160 will set up the subgroup 175 by assigning a group number, passwords to all group members and job codes for each of the selected job summaries. Once job summaries and passwords are created, the group members can begin loading wage and salary information into the database 90. After the information has been quality checked by the service providers 160, survey subgroup members may extract wage and salary reports from the database 90.

The information contained within the data group 145 of the subgroup 175 may be configured to be accessed merely by members of the survey subgroup 175 or, alternatively, can be made available to other contributors and subscribers. The availability of this data would, of course, determine the subscription price for members of the subgroup 175. If the data were limited solely to members of the subgroup 175, a higher cost per group member would be required. Information made generally available to other members of the salary survey service provider 160 would enable reduced fees since additional benefits are obtained by the survey provider from the contributed information.

Figure 21:
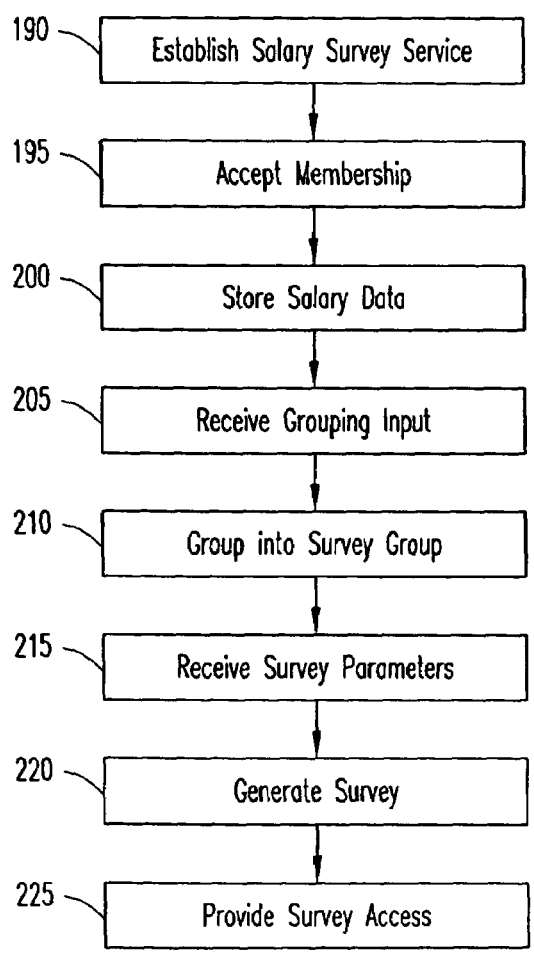
FIG. 21 is a flow diagram illustrating the process for forming a survey subgroup according to the present invention.

Referring now to FIG. 21, there is a flow diagram illustrating the process by which a subgroup 175 (FIG. 17) survey may be formed using the group survey report functionality 180 of the server 85. A salary survey service provider 160 is established at step 190 that is accessible via the Internet 170 or some other type of network. The service is established by connecting a server 85 to the Internet 170 or other network. The salary service provider 160 accepts at step 195 memberships from a number of companies 165. After becoming members, the members (contributors) store at step 200 salary data associated with the member company within the salary service provider database 90. The group survey report functionality 180 receives at step 205 input from a number of member companies indicating a subscription subgrouping consisting of a number of companies that wish to be associated with each other for the purpose of performing various surveys and obtaining reports. These companies are grouped together at step 210 in order to establish a subgroup 175 for each of the associated members. The members of the subgroup provide survey request parameters which are received at step 215 at the server 90 associated with the salary service provider and used to generate reports at step 220 according to the provided parameters. In this fashion, a survey specific to the members of the subgroup 175 is generated at the server. The survey results are stored at step 225 in the database 230 and may be accessed at step 130 via the Internet 170 or other type of network by members of the subgroup 175, or alternatively, by other non-member companies.

The previous description is of a preferred embodiment for implementing the invention, and the scope of the invention should not necessarily be limited by this description. The scope of the present invention is instead defined by the following claims.

What is claimed is:

1. A method for providing a salary report to a self designated survey group utilizing a computer processing system, said method comprising the steps of:
   providing a computer processing system comprising:
      at least one computer processor for processing salary data;
      a storage medium for storing salary data;
      a graphical user interface for receiving salary data;
   establishing a salary survey service for storing and accessing salary data, for a self designated group, on said computer processing system;
   said establishing step comprising establishing-parameters for inclusion in said self-designated group and job positions to include in the salary survey;
   accepting memberships from a plurality of companies to the salary survey service;
   receiving, verifying and storing salary data from a plurality of member companies on said storage medium which comprises the step of transferring said verified data from a wage information unconfirmed table to a wage information table by transferring information comprising at least an account ID, a job code, a job title, an average wage base, an average total compensation and an effective date from said wage information unconfirmed table to said wage information table;
   aging at least a portion of said salary data utilizing at least one annual growth rate selected at the time of generating said report for at least a portion of said stored salary data;
   entering a plurality of parameters utilizing standard query language, said parameters comprising an annual growth rate expressed as a percentage and at least one of a geographical parameter defining at least one geographical region for said salary report, a job position, a company size designator, and an industry designator; and
   generating a salary report for the survey group and for said entered parameters.

2. The method of claim 1, wherein members of the survey group are from at least one of a same industry, size, profession, or geographic region.

3. The method of claim 1, wherein the plurality of members to the salary service comprise companies.

4. The method of claim 1, wherein the plurality of members to the salary service comprise individuals.

5. The method of claim 1, wherein the plurality of members to the salary service comprise members of at least one trade associations.

6. The method of claim 1, wherein the step of accepting memberships comprises accepting contributor memberships and subscriber memberships.

7. The method of claim 1, further comprising the step of forming at least one subgroup comprising less than all of the members of said group.

8. The method of claim 1, wherein the step of generating further includes the step of receiving at least one parameter defining information to be presented by the salary survey.

9. The method of claim 1, further comprising the step of providing Internet access to said report, wherein the step of providing access further comprises the step of providing access to only members of the survey group.

10. The method of claim 1, wherein the step of providing access further comprises the step of providing access to the plurality of members of the salary survey service.

11. The method of claim 1, wherein the salary data relates to predetermined job positions.

12. A method according to claim 8 wherein said at least one parameter comprises company size.

13. A method according to claim 8 wherein said at least one parameter comprises at least one industry.

14. A method according to claim 8 wherein said at least one parameter comprises at least one geographic region.

15. A method according to claim 1 further comprising the steps of holding received data for verification and releasing said salary data after verification.

16. A method according to claim 1 wherein data which was in said wage information database table and was replaced by verified data, is archived.

17. A method for providing a salary report to a survey group utilizing a computer processing system, said method comprising the steps of:
   providing a computer processing system comprising:
      at least one computer processor for processing salary data;
      a storage medium for storing salary data;
      a graphical user interface for receiving salary data;

establishing a salary survey service for storing and accessing salary data, for a self designated group, on said computer processing system;

accepting salary data from a plurality of participants to the salary survey service;

receiving, verifying and storing the salary data from the participants on said storage medium which comprises the step of transferring said verified data from a wage information unconfirmed table to a wage information table by transferring information comprising at least an account ID, a job code, a job title, an average wage base, an average total compensation and an effective date from said wage information unconfirmed table to said wage information table;

receiving designations from the participants indicating group defining parameters for the participants to be included in a survey group, wherein said designations include geographical information;

grouping a portion of the participants into the survey group designated by a portion of the plurality of participants;

receiving survey parameters defining information to be presented by the salary survey;

providing participants with the ability to select particular job positions which are surveyed;

aging at least a portion of said salary data at the time of generating said report for at least a portion of said stored salary data;

generating a salary report for the survey group using the aged salary data; and providing access via an Internet to the salary report.

18. The method of claim 17, wherein members of the survey group are from at least one of a same industry, revenue size, profession, or geographic region.

19. The method of claim 17, wherein the plurality of members to the salary service comprise companies.

20. The method of claim 17, wherein the plurality of members to the salary service comprise individuals.

21. The method of claim 17, wherein the plurality of members to the salary service comprise trade associations.

22. The method of claim 17, wherein the step of providing access further comprises the step of providing access to only members of the survey group.

23. The method of claim 17, wherein the step of providing access further comprises the step of providing access to the plurality of members of the salary survey service.

24. The method of claim 17, wherein the salary data relates to predetermined job positions.

25. A method according to claim 17 wherein data which was in said wage information database table and was replaced by verified data, is archived.

26. An apparatus comprising a computer processing system for providing a salary survey report to participants of a survey group via an Internet, said apparatus comprising:

at least one computer processor for processing salary data;

a storage medium for storing salary data received from at least a portion of said participants;

a graphical user interface for receiving unverified salary data from participants of a salary survey service wherein said interface is operatively connected to said computer processor;

a communication unit providing access to the Internet;

said at least one computer processor verifying said unverified salary data and transferring said verified data from a wage unconfirmed table to a wage information table by transferring information comprising at least an account ID, a job code, a job title, an average wage base, an average total compensation and an effective date from said wage information unconfirmed table to said wage information table;

said at least one computer processor further grouping a portion of the plurality of participants into a survey group designated by said portion of the plurality of participants and generating a salary report for participants of the survey group.

27. An apparatus according to claim 26, wherein participants of the survey group are grouped according to at least one of industry, size, profession, or geographic region.

28. An apparatus according to claim 26, wherein the plurality of participants to the salary service comprise companies.

29. An apparatus according to claim 26, wherein the plurality of participants to the salary service comprise individuals.

30. An apparatus according to claim 26, wherein the plurality of participants to the salary service comprise trade associations.

31. An apparatus according to claim 26, wherein said participants comprise contributing members and subscriber members.

32. An apparatus according to claim 26, wherein said graphical user interface is further configured to receive designations indicating the participants to be included in the survey group.

33. An apparatus according to claim 26, wherein said graphical user interface is further configured to receive at least one parameter defining information to be presented by the salary survey.

34. An apparatus according to claim 26, wherein said communication unit is further configured to provide access to only participants of the survey group.

35. An apparatus according to claim 26, wherein said communication unit is further configured to provide access to the plurality of participants of the salary survey service.

36. An apparatus according to claim 26, wherein the salary data is related to said predetermined job positions.

37. An apparatus according to claim 33 wherein said at least one parameter comprises company size.

38. An apparatus according to claim 33 wherein said at least one parameter comprises at least one industry.

39. An apparatus according to claim 33 wherein said at least one parameter comprises at least one geographic region.

* * * * *

UNITED STATES PATENT AND TRADEMARK OFFICE
CERTIFICATE OF CORRECTION

PATENT NO. : 7,620,654 B2  Page 1 of 1
APPLICATION NO. : 10/057016
DATED : November 17, 2009
INVENTOR(S) : Theodore Turnasella It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 287 days.

Signed and Sealed this

Twenty-sixth Day of October, 2010

David J. Kappos
*Director of the United States Patent and Trademark Office*